Patented Apr. 6, 1943

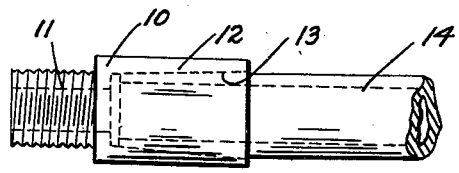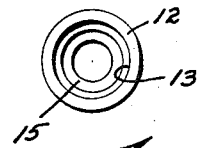
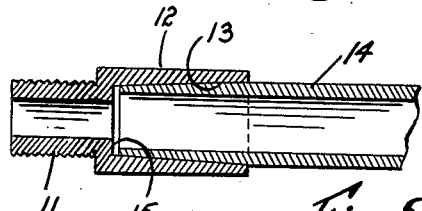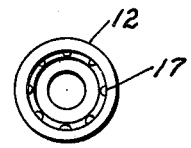
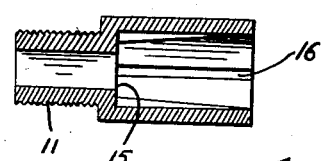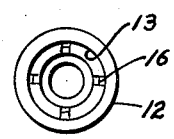
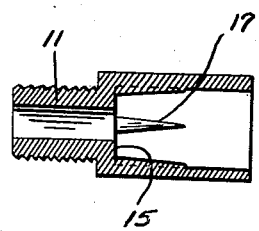
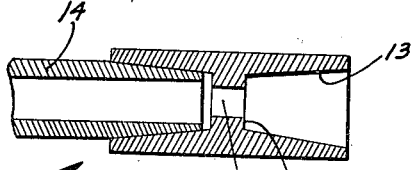

2,315,792

UNITED STATES PATENT OFFICE 2,315,792

ADAPTER

Arthur B. Hoss, Milwaukee, Wis.

Application April 21, 1941, Serial No. 389,648

2 Claims. (Cl. 285—160)

My invention relates to adapters and more particularly to the type of adapter that has a male and female arrangement for use with conduit or pipe.

The object of my invention is to provide a means for attaching the adapted to a conduit box or the like on one end and a female sleeve adapted to receive the unthreaded or plain end of conduit pipe thereby eliminating the necessity of threading the conduit.

Another object of my invention is to so construct the inner wall of the sleeve arrangement so that the conduit may be wedged into a rigid position thereby forming a rigidly constructed joint.

A still further object of my invention is to form raised serrations in the inside wall of the female adapter to guide the end of the conduit when driven into position and preventing it from being turned thereby facilitating the engagement of the threaded male end of the adapter and permit its being held in position when the lock nut is applied in the inside of the conduit box.

A still further object of my invention is to provide an adapter that has two female sleeves having their inside walls tapered to permit joining the ends of conduit pipes without the necessity of threading.

Other and further objects of my invention will become more apparent as the description proceeds when taken in conjunction with the accompanying drawing wherein—

Figure 1 is a perspective view of an adapter having the male end threaded and the female sleeve arrangement tapered on the inside to accommodate the end of the conduit.

Figure 2 is a cross-sectional view of Figure 1.

Figure 3 is a cross-sectional view of a modified form of adapter having recessed grooves disposed in the tapered surface of the sleeve.

Figure 4 is a cross-sectional view of a modified form of adapter showing tapered serrations on the inside tapered wall of the sleeve.

Figure 5 is an end view of the adapter shown in Figures 1 and 2.

Figure 6 is an end view of the adapter shown in Figure 4.

Figure 7 is an end view of the adapter shown in Figure 3 and

Figure 8 is a modified type of adapter having a female sleeve arrangement on both sides adapted to receive the ends of conduit pipes.

Similar characters of reference denote corresponding parts throughout the several views and referring now to the same, the character 10 shows an adapter provided with a male member 11 and a sleeve member 12 having a tapered inner surface 13.

The conduit 14 is shown wedged against the inner face 13 of the sleeve 12 thereby making a rigid, tight joint. The adapter 10 is provided with a shoulder 15 acting as a guide for the conduit 14 and limiting the amount of its contact. If desired, the tapered inner surface 13 may be provided with a plurality of recessed grooves 16 as shown in Figures 3 and 7 to guide the conduit and forming a contact that will prevent the revolving of the conduit 14 when driven against the tapered surface 13. Likewise raised serrations 17 as shown in Figures 4 and 6 may be employed for the same purpose that of retaining the conduit 14 in a fixed position with the inner surface 13 of the sleeve 12 and eliminating the possibility of its revolving.

In Figure 8 is shown a modified form of adapter consisting of two sleeve portions having their inner surface 13 tapered and joined at their inner extremities by a tubular member 18. This type of adapter is arranged to accommodate two ends of conduit for joining them without the necessity of threading.

Obviously, the outer area of the adapter may be round, hexagon or any other shape to provide a convenient gripping surface when applying a wrench or the like during the process of installation and the threaded male section 11 may be constructed to receive a threaded lock nut or the like which is the customary practice when attaching a conduit box to the end of conduit.

It is manifest to anyone familiar with the art that an adapter as specified provides a convenient method for joining the ends of conduit one to the other or to a conduit box or receptacle. Frequently, conduit is imbedded in concrete or supported within the structural walls making it practically impossible to thread the end without removing the conduit and a device of the nature described may be driven into place by inserting the end of the conduit into the sleeve 12 and a rigid, tight joint is attained.

Having thus explained the nature of my invention and described a way of making and using same although without attempting to set forth all of the form in which it may be made or all of the modes of its use, it is hereby understood, however, that I may make such changes as I deem necessary without departing from the spirit of my invention as set forth in the appended claims, what I claim and desire to secure by Letters Patent in the United States is:

1. An adapter of the character described comprising a tubular member having cylindrical sleeves disposed on both ends, said sleeve portions having their inner surfaces tapered downward from the open end toward one another, said tapered inner surfaces provided with a plurality of inwardly extending serrations disposed longitudinally with said tapered inner surfaces.

2. An adapter of the character described comprising a tubular member having a cylindrical sleeve disposed on one end, an externally threaded portion on the other end, said sleeve portion having its inner surface tapered downward from the open end, said tapered inner surface provided with a plurality of inwardly extending serrations disposed longitudinally with said tapered inner surface.

ARTHUR B. HOSS.